US006807306B1

(12) United States Patent
Girgensohn et al.

(10) Patent No.: US 6,807,306 B1
(45) Date of Patent: Oct. 19, 2004

(54) TIME-CONSTRAINED KEYFRAME SELECTION METHOD

(75) Inventors: Andreas Girgensohn, Menlo Park, CA (US); John S. Boreczky, San Leandro, CA (US)

(73) Assignees: Xerox Corporation, Stamford, CT (US); FujiXerox Co., Ltd., Tokyo (JP)

( * ) Notice: Subject to any disclaimer, the term of this patent is extended or adjusted under 35 U.S.C. 154(b) by 0 days.

(21) Appl. No.: 09/322,842

(22) Filed: May 28, 1999

(51) Int. Cl.[7] .............................. G06K 9/62; G06K 9/63; H04N 5/14

(52) U.S. Cl. ......................... 382/225; 382/226; 348/701

(58) Field of Search ................................ 382/224, 225, 382/226; 348/700, 701, 590; 345/328; 368/69, 121

(56) References Cited

U.S. PATENT DOCUMENTS

| | | | | |
|---|---|---|---|---|
| 5,513,306 A | * | 4/1996 | Mills et al. ................. | 707/530 |
| 5,635,982 A | * | 6/1997 | Zhang et al. ............... | 348/231 |
| 5,708,767 A | * | 1/1998 | Yeo et al. .................... | 345/440 |
| 5,801,765 A | * | 9/1998 | Gotoh et al. ................ | 348/155 |
| 5,831,616 A | * | 11/1998 | Lee .............................. | 345/348 |
| 5,832,182 A | * | 11/1998 | Zhang et al. ................. | 706/50 |
| 5,995,095 A | * | 11/1999 | Ratakonda .................. | 345/328 |
| 6,185,363 B1 | * | 2/2001 | Dimitrova et al. ............ | 386/69 |
| 6,195,458 B1 | * | 2/2001 | Warnick et al. ............. | 382/173 |

OTHER PUBLICATIONS

J. Boreczky and L. Rowe, "Comparison of Video Shot Boundary Detection Techniques," in Storage and Retrieval for Still Image and Video Databases IV, *Proc. SPIE 2670*, San Jose, CA, pp. 170–179, 1996.

A.M. Ferman and A.M. Tekalp, "Multiscale Content Extraction and Representation for Video Indexing," in Multimedia Storage and Archiving Systems II, *Proc. SPIE 3229*, Dallas, TX, pp. 23–31, 1997.

(List continued on next page.)

*Primary Examiner*—Mehrdad Dastouri
(74) *Attorney, Agent, or Firm*—Fliesler, Dubb, Meyer & Lovejoy LLP

(57) ABSTRACT

A method for candidate frame selection involves sampling the source frames of the source video at a predetermined fixed periodic interval. The largest frame differences represent candidate boundaries, and the frames before and after the N/2 largest candidate boundaries are selected as candidate frames. A method for selecting keyframes involves clustering all candidate frames into a hierarchical binary tree using a hierarchical agglomerative clustering algorithm. Optionally, the pairwise distances for the members of the two clusters is modified according to class membership of the members, which is preferably determined statistically from image class statistical models. A method for selecting M clusters from which keyframes are extracted involves splitting the M-1 largest clusters of a hierarchical binary tree of clusters. Optionally, clusters not having at least one uninterrupted sequence of frames of at least a minimum duration are filtered out. The source video duration is divided into equal duration intervals. If an interval has no keyframes, all other intervals having at least two keyframes are inspected in descending keyframe count order to attempt to find a keyframe within a cluster that has a member within the interval that does not have any keyframes. If such a keyframe is found, the member is substituted as the keyframe for the cluster. The minimum time between any two keyframes is determined. If this minimum time is less than a minimum time threshold, an attempt is made to find another keyframe from one or both of the two clusters which the two conflicting keyframe belong to. If a substitute cannot be found, one of the conflicting keyframes is deleted.

3 Claims, 16 Drawing Sheets

OTHER PUBLICATIONS

B. Gunsel, Y. Fu, and A.M. Tekalp, "Hierarchical Temporal Video Segmentation and Content Characterization," in Multimedia Storage and Archiving Systems II, *Proc. SPIE 3229*, Dallas, TX, pp. 46–56, 1997.

X. Sun, M.S. Kankanhalli, Y. Zhu and J. Wu, "Content–Based Representative Frame Extraction for Digital Video," 1998 *IEEE Conference of Multimedia Computing and Systems*, Austin, TX, pp. 190–193, May 1998.

Y. Taniguchi, A. Akutsu, and Y. Tonomura, "PanoramaExcerpts: Extracting and Packing Panoramas for Video Browsing," *In Proc. ACM Multimedia 97*, Seattle, WA, pp. 427–436, 1997.

M.M. Yeung, B.L. Yeo, W. Wolf and B. Liu, "Video Browsing using Clustering and Scene Transitions on Compressed Sequences," in SPIE vol. 2417 Multimedia Computing and Networking 1995, pp. 399–413, 1995.

Y. Tonomura, A. Akutsu, K. Otsuji, T. Sadakata, "VideoMAP and VideoSpaceIcon: Tools for Anatomizing Video Content," in Proc. ACM INTERCHI '93, pp. 131–136, Apr. 1993.

* cited by examiner

TIME-CONSTRAINED KEYFRAME SELECTION METHOD

BACKGROUND OF THE INVENTION

1. FIELD OF THE INVENTION

The present invention is generally related to the field of video image processing. The present invention relates to the field of processing video for the purpose of automatically locating specific content. Specifically, the present invention pertains to the selection of keyframes from a video which are used to represent or summarize the visual content of the video, so that the keyframes may be used by any one of a variety of applications which utilize keyframes for various purposes.

2. DISCUSSION OF THE RELATED ART

When reviewing collections of videos such as recorded meetings or presentations, users are often interested only in an overview of these documents. At FX Palo Alto Laboratory, weekly staff meetings and other seminars and presentations are held in a conference room outfitted with several video cameras. All formal meetings and most presentations are videotaped, MPEG-encoded, and made available to the staff via the company intranet. These videos amount to about three hours per week; more than 150 hours of video exist in the database. It is often difficult to find both the appropriate video file and the portion of the video that is of interest. As video is used more and more as a permanent record for decisions made in meetings and video conferences, it becomes more important to locate the passages containing relevant information or even the meeting in which a decision was made. It is desirable to help users locate specific video passages quickly and provide the users with visual summaries of the videos.

Keyframes are used to distinguish videos from each other, to summarize videos, and to provide access points into them. Well-chosen keyframes help video selection and make the listing more visually appealing. However, it is difficult to determine a single frame that the best represents the whole video. It also is difficult to distinguish videos based on a single keyframe, so it is desirable to provide a number of keyframes. As is apparent from the above discussion, a need exists for determining a set of keyframes that describes an entire video clip well.

Most of the related art has been applied to professionally produced material such as movies, TV comedies, and news programs. That art has concentrated on breaking video into shots and then finding keyframes corresponding to those shots. The results of that art are not directly applicable to the applications of the methods of the present invention. First, videotaped meetings and presentations are produced in a more ad hoc fashion so that it is not reasonable to rely on established production practices. Second, using one or more keyframes from each shot produces more keyframes than needed for many application.

Many of the conventional systems described in the literature use a constant number of keyframes for each detected shot. Some use the first frame of each shot as a keyframe. Others represent shots with two keyframes—the first and last frames of each shot. Others use clustering on the frames within each shot. The frame closest to the center of the largest cluster is selected as the keyframe for that shot. Some generate a composite image to represent shots with camera motion.

Other conventional systems use more keyframes to represent shots that have more interesting visual content. Some segment the video into shots and select the first clean frame of each shot as a keyframe. Other frames in the shot that are sufficiently different from the last keyframe are marked as keyframes as well.

One way to reduce the number of keyframes is to remove redundancies. One conventional approach selects one keyframe for each video shot. These keyframes are then clustered based on visual similarity and temporal distance. Since their purpose is to group shots to determine video structure, the temporal constraints are used to prevent keyframes that occur far apart in time from being grouped together.

A conventional system divides a video into intervals of equal length and determine the intervals with the largest dissimilarity between the first and last frame. All frames from those intervals are kept whereas only two frames from each of the remaining intervals is kept. The process is repeated until the desired number of frames or less is left. This approach takes only fairly localized similarities into consideration and cannot apply constraints for frame distribution or minimum distance.

A conventional system also provides an alternate representation of a video sequence that uses keyframes that are evenly spaced, ignoring shot boundaries.

The conventional systems do not meet the goal of extracting an exact number of representative keyframes. Existing systems either provide only limited control over the number of keyframes or do not perform an adequate job of finding truly representative frames. In addition, other systems do not apply temporal constraints for keyframe distribution and spacing.

Conventional evenly spaced keyframes do not provide sufficient coverage of video content. Thus, as is apparent from the above discussion, a need exists for a keyframe selection method which provides sufficient coverage of video content.

SUMMARY OF THE INVENTION

In accessing large collections of digitized videos, it is conventionally difficult to find both the appropriate video file and the portion of the video that is of interest. Keyframes are used in many different applications to provide access to video. However, most conventional algorithms do not consider time. Also, most conventional keyframe selection approaches first segment a video into shots before selecting one or several keyframes for every shot. According to the present invention, time constraints are placed on the selected video frames because they align keyframes spatially to a timescale. According to the present invention, selecting candidate frames does not require any explicit prior shot segmentation. Instead, a number of candidate boundaries much larger than the actual number of shot boundaries is determined and the frames before and after those boundaries are selected. The methods of the present invention gracefully deals with significant changes during a shot without missing important keyframes. While most conventional keyframe selection algorithms select at least one keyframe per shot, the method according to the present invention selects far fewer keyframes than the number of shots by returning exactly the requested number of keyframes. The method according to the present invention selects keyframes from the candidate frames using a hierarchical clustering method.

A method for selecting keyframes based on image similarity produces a variable number of keyframes that meet various temporal constraints. A hierarchical clustering approach determines exactly as many clusters as requested keyframes. Temporal constraints determine which representative frame from each cluster is chosen as a keyframe. The detection of features such as slide images and close-ups of people are used to modify the clustering of frames to emphasize keyframes with desirable features.

The present invention includes a method for determining keyframes that are different from each other and provide a good representation of the whole video. Keyframes are used distinguish videos from each other, to summarize videos, and to provide access points into them. The methods of the present invention determine any number of keyframes by clustering the frames in a video and by selecting a representative frame from each cluster. Temporal constraints are used to filter out some clusters and to determine the representative frame for a cluster. Desirable visual features are emphasized in the set of keyframes. An application for browsing a collection of videos makes use of the keyframes to support skimming and to provide visual summaries.

According to an aspect of the present invention, a method for candidate frame selection involves sampling the source frames of the source video at a predetermined fixed periodic interval. Preferably, the fixed periodic interval is a function of the type of the video, and preferably ranges from about 0.2 to 0.5 seconds. A frame difference is computed for each sampled frame which indicates the difference between the sampled frame and the previous sampled frame. The largest frame differences represent candidate boundaries, and the frames before and after the N/2 largest candidate boundaries are selected as candidate frames in order to achieve up to N candidate frames. Optionally, the distance measure is modified according to the class membership of the frames. The class membership of the frames is optionally computed statistically from image class statistical models.

According to yet another aspect of the present invention, a method for selecting keyframes involves clustering all candidate frames into a hierarchical binary tree using a hierarchical agglomerative clustering algorithm. Initially, all frames are deemed single-frame clusters. The two clusters having the lowest maximum pairwise distance between any two frames (one frame from each of the two clusters) become the two constituent clusters of a larger cluster. The clustering continues until a single root cluster contains all the candidate frames. Optionally, the pairwise distances for the members of the two clusters is modified according to class membership of the members, which is preferably determined statistically from image class statistical models.

According to yet another aspect of the present invention, a method for selecting M clusters from which keyframes are extracted involves splitting the M-1 largest clusters of a hierarchical binary tree of clusters. The size of a cluster is determined by the number of frames within all the sub-clusters contained in the cluster. Optionally, clusters not having at least one uninterrupted sequence of frames of at least a minimum duration are filtered out. Clusters representing single frames are preferably filtered out because they are likely to represent video artifacts such as distortions.

According to still another aspect of the present invention, a method for selecting keyframes applies temporal constraints in order to attempt to guarantee keyframe inclusion in all portions of a video, and to guarantee at least a minimum separation between keyframes. The source video duration is divided into equal duration intervals. If an interval has no keyframes, all other intervals having at least two keyframes are inspected in descending keyframe count order to attempt to find a keyframe within a cluster that has a member within the interval that does not have any keyframes. If such a keyframe is found, the member is substituted as the keyframe for the cluster, thereby spreading out the keyframe distribution. In order to guarantee minimum keyframe separation, the minimum time between any two keyframes is determined. If this minimum time is less than a minimum time threshold, an attempt is made to find another keyframe from one or both of the two clusters which the two conflicting keyframe belong to. If a substitute cannot be found, one of the conflicting keyframes is deleted.

Thus, a variable number of distinct keyframes that provide a good representation of all the frames in the video is determined according to the present invention. According to the present invention, hierarchical clustering is performed and single frames are selected from each cluster. In an alternative, if more or fewer keyframes are desired by the user or application, the number of clusters is simply increased or decreased according to the present invention. According to the present invention, temporal constraints are used to filter out unsuitable clusters and to select a representative frame for each cluster. The present invention uses temporal constraints to prevent keyframes from appearing too close together in time.

An application using the keyframe extraction mechanism allows users to access a collection of video-taped staff meetings and presentations. The keyframe skimming interface greatly simplifies the task of finding the appropriate video and getting an overview of it. These and other aspects, features, and advantages of the present invention will be apparent from the Figures, which are fully described in the Detailed Description of the Invention.

In the Figures, like steps are referred to with like references numerals. The Figures are more thoroughly described in narrative form in the Detailed Description of the Invention.

DETAILED DESCRIPTION OF THE INVENTION

Keyframes are used in a variety of ways to provide access to video. However, it is difficult to determine a set of keyframes that describes an entire video clip well. In addition, some applications establish additional requirements such as an exact number of keyframes, a minimum distance between keyframes in time, or an even distribution over time. The present invention includes a method for extracting a set of keyframes that summarizes an entire video clip while conforming to different temporal constraints. Both the ability to deliver many more or many fewer keyframes than the number of shots and the use of temporal constraints with clustering are novel aspects of the present invention.

Figure 1:
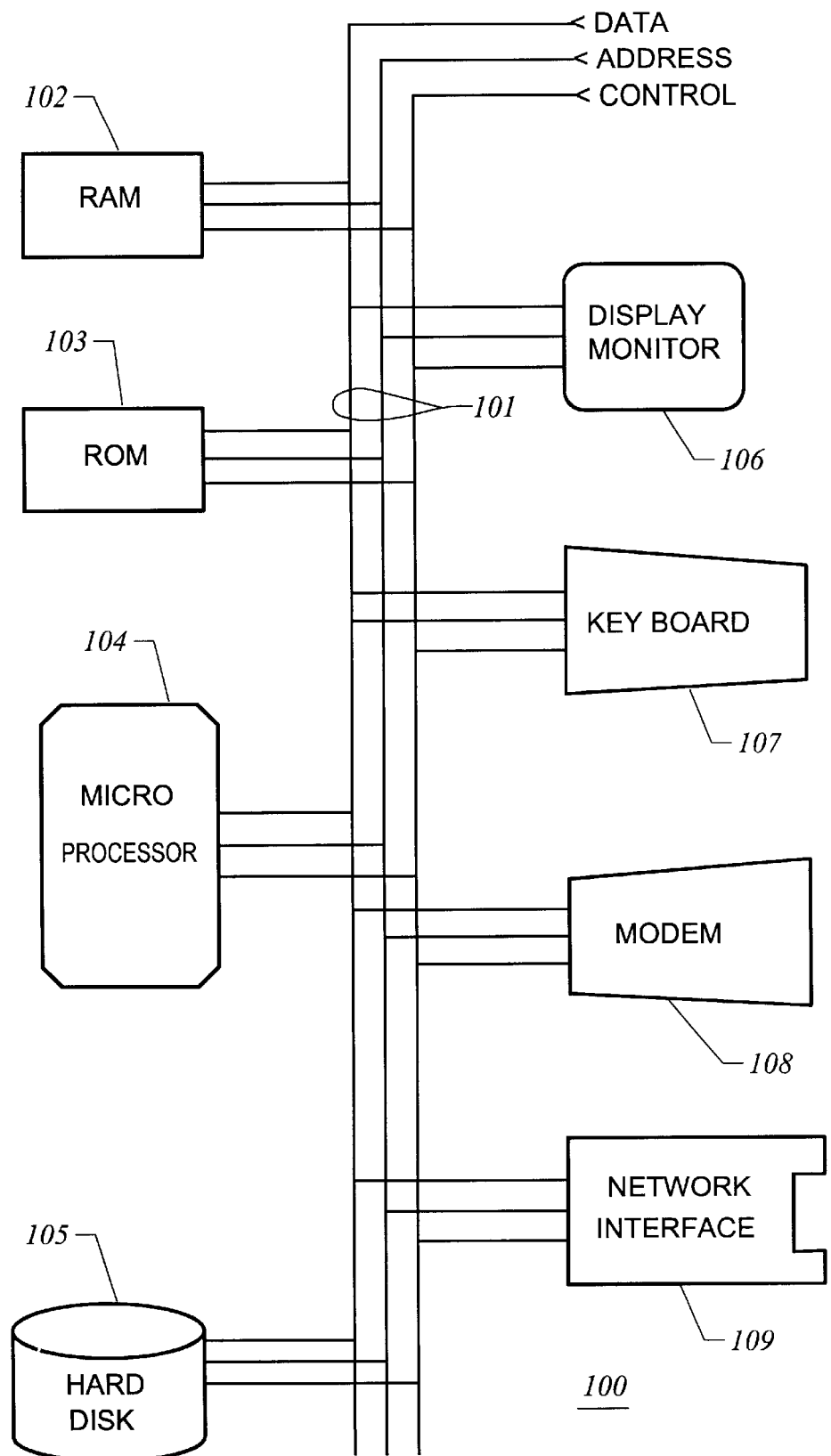
FIG. 1 illustrates a general-purpose computer architecture suitable for executing the methods according to the present invention.

FIG. 1 illustrates a general purpose computer system 100 suitable for implementing the methods according to the present invention. The general purpose computer system 100 includes at least a microprocessor 104. The general purpose computer may also include random access memory 102, ROM memory 103, a keyboard 107, and a modem 108. All of the elements of the general purpose computer 100 are optionally tied together by a common bus 101 for transporting data between the various elements. The bus 101 typically includes data, address, and control signals. Although the general purpose computer 100 illustrated in FIG. 1 includes a single data bus 101 which ties together all of the elements of the general purpose computer 100, there is no requirement that there be a single communication bus 101 which connects the various elements of the general purpose computer 100. For example, the microprocessor 104, RAM 102, and ROM 103, are alternatively tied together with a data bus while the hard disk 105, modem 108, keyboard 107, display monitor 106, and network interface 109 are connected together with a second data bus (not shown). In this case, the first data bus 101 and the second data bus (not shown) are linked by a bidirectional bus interface (not shown). Alternatively, some of the elements, such as the microprocessor 102 and RAM 102 are connected to both the first data bus 101 and the second data bus (not shown), and communication between the first and second data bus occurs through the microprocessor 102 and RAM 102. The network interface 109 provides optional communication capability to a local area network LAN using an ethernet connection, for example. The modem 108 allows the computer 100 to communicate optionally through the telephone system. The methods of the present invention are executable on any general purpose computer system such as the 100 illustrated in FIG. 1, but there is clearly no limitation that this computer system is the only one which can execute the methods of the present invention.

Figure 2:
FIG. 2 illustrates an application which utilizes the keyframes which result from the execution of the methods according to the present invention.

Two applications make use of the keyframe extraction. The first application places the positions of the extracted keyframes along a mouse-sensitive timeline. As the mouse moves over the timeline, the keyframe closest to the mouse position is displayed (see FIG. 2). The application requires that the keyframes be fairly evenly distributed over time so that there are keyframes associated with all parts of the video clip. Also, the application requires a number of keyframes dependant on the length on the video clip and not determined by the number of shots in the video to facilitate skimming.

Figure 3:
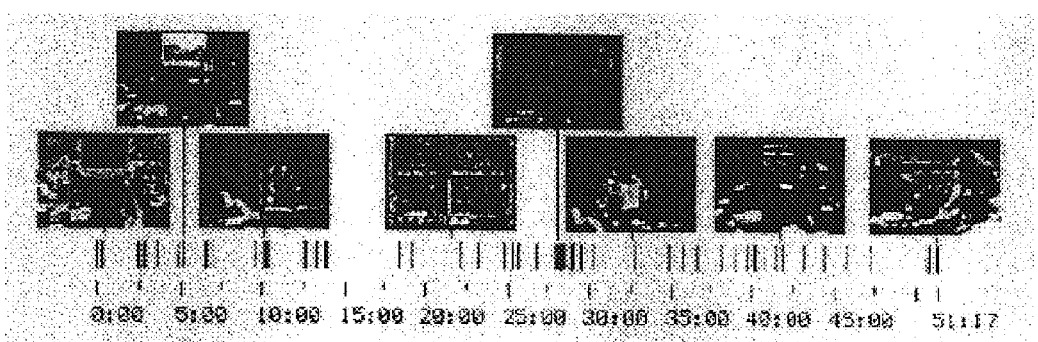
FIG. 3 illustrates another application which utilizes the keyframes which result from the execution of the methods according to the present invention.

The second application displays all the keyframes attached to the timescale at the same time to make the display suitable for printing (see FIG. 3). In addition to all the constraints of the first application, this application also has the constraints that keyframes should not be too close to each other so that they are displayed at the appropriate position without overlapping each other.

Figure 4:
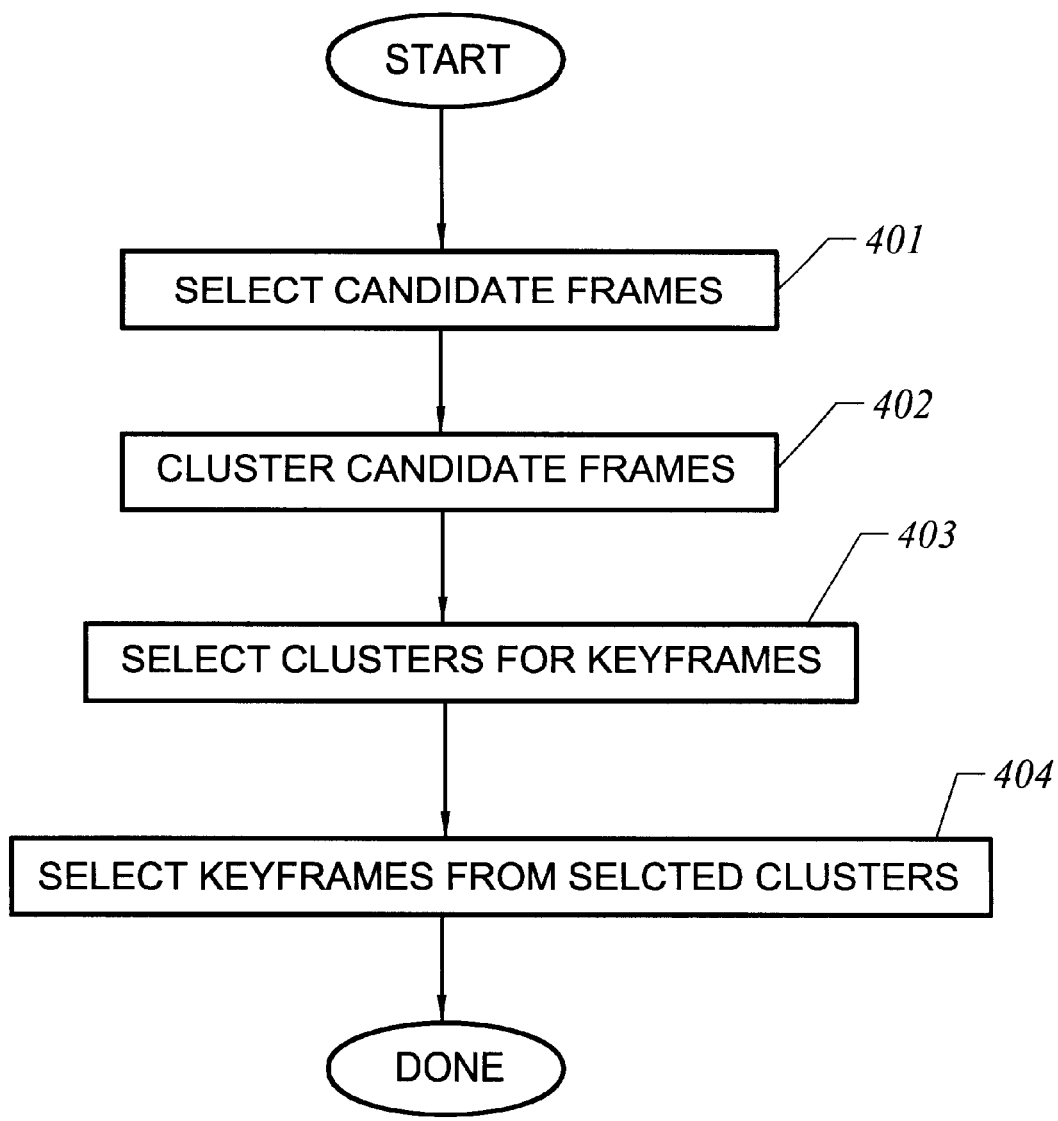
FIG. 4 is a high-level flow chart illustrating the steps in the method for selecting keyframes from a source video according to the present invention.

The present invention includes a method for determining keyframes that are different from each other and provide a good representation of the whole video. The present invention describes a novel technique for selecting keyframe using a hierarchical clustering technique and temporal constraints. Similar frames are clusters so that different keyframes are determined by selecting one frame from each cluster. Several steps are performed in determining keyframes, as illustrated in FIG. 4.

First, a number of candidate frames to be used as the input to the hierarchical clustering algorithm is determined at step 401. Selecting evenly spaced frames either returns too many frames to compute the cluster hierarchy in a reasonable amount of time or uses intervals between frames that are so large that important details are frequently missed. Instead, a collection of frames that are already fairly different from each other is used according to the present invention. This collection is determined by collecting all adjacent pairs of frames that exhibit large differences in an image comparison. Rather than setting a fixed threshold for the comparison score, a fixed number of frames that are most dissimilar to their neighbors is determined according to the present invention.

The selected candidates are then clustered with a hierarchical agglomerative clustering method according to the present invention at step 402. Some of the clusters are filtered out using temporal constraints. Afterwards, a number of clusters are selected equal to the number of desired keyframes at step 403. From each cluster, the member that best meets some temporal constraints is selected as the keyframe according to the present invention at step 404. Such constraints according to the present invention require a somewhat even distribution of keyframes over the length of the video and a minimum distance between keyframes.

To change the emphasis of certain classes of keyframes such as close-ups or slide images, the distance function used by the clustering algorithm is modified according to the present invention. Decreasing the distance between less desirable images according to the present invention increases the likelihood that they will end up in the same cluster and therefore be represented less in the set of keyframes. Increasing the distance between desirable images has the opposite effect according to the present invention.

Selecting Candidate Frames

Figure 5:
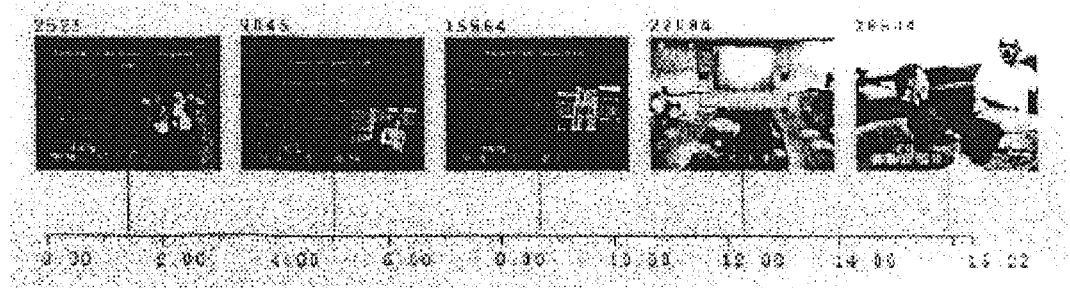
FIG. 5 illustrates a collection of equidistant keyframes taken at fixed periodic intervals from a source video.

It is desirable to select candidates for keyframes from different shots or camera orientations rather than just sampling them at fixed intervals. Conventionally, in a collection of equidistant frames, long scenes without much change are heavily emphasized, as shown in FIG. 5. Frames that are very similar to other frames will most likely end up in the same cluster so that they do not contribute much to the keyframe selection. At the same time, frames from very short shots are skipped or missed with an equidistant selection.

Figure 6:
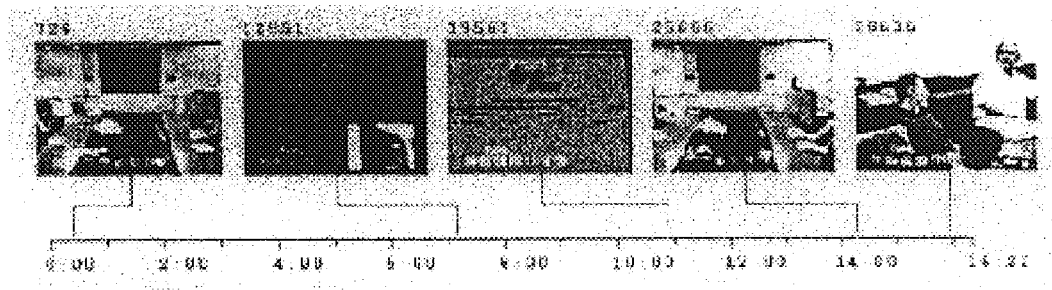
FIG. 6 illustrates a collection of keyframes derived from hierarchical clustering of the frames in a source video.

The time complexity of the clustering algorithm is between $O(n^3)$ and $O(n^4)$ with respect to the number of candidates so that it is important to select promising candidates rather than just to increase the total number of candidates. Hierarchical clustering of the frames in the video produces better results as shown in FIG. 6. The selected frames provide a good account of the meeting.

Unfortunately, clustering is a computationally expensive operation so that it is not feasible to attempt to cluster all frames in a video. To overcome the run-time limitations, candidates for keyframes that are dissimilar from each other are collected according to the present invention. The minimum number of candidates needed depends on the amount of change in the video and on the number of clusters that will be filtered out by the temporal constraints described below. For each candidate boundary, the frames before and after the boundary are selected as candidates. For a one hour video, 1,000 candidates are typical but a larger number does not hurt the performance of the algorithm, only its runtime. Frames that are very similar to other frames will most likely end up in the same cluster so that they do not contribute much to the keyframe selection. All pairs of adjacent frames that show large differences in an image comparison are collected according to the present invention. Including both frames of the pair rather than just one of them addresses situations in which a video sequence changes very gradually over time. Rather than selecting a fixed threshold, we keep a buffer with the N frames that are most dissimilar to their neighbors. If a video contains fewer samples than the buffer size, all sampled frames are clustered. Otherwise, only the most promising ones are considered.

Figure 7:
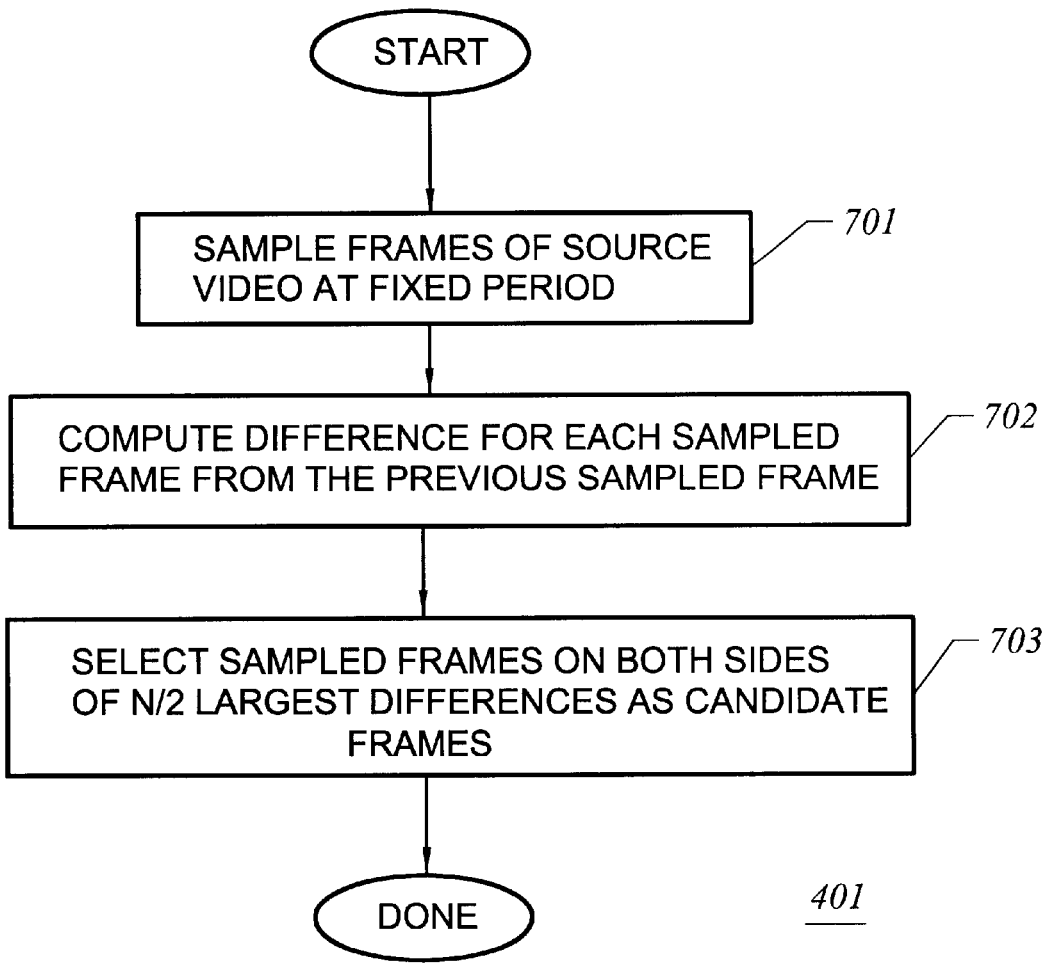
FIG. 7 is a flow chart illustrating the steps performed in the selection of candidate frames prior to clustering according to the present invention.

Conventionally, shot boundaries are determined and one or more keyframes from each shot are selected. FIG. 7 illustrates the method of selecting candidate frames according to the present invention employed in step 401 of FIG. 4. In contrast to conventional approaches, according to the present invention, frames are sampled between two and five times per second to skip over fades and dissolves and to reduce the number of frames to be processed at step 701. At step 702, the difference between each sampled frame from the previous sampled frame is computed for all sampled frames using any one of a variety of distance measures. Fast-paced material such as TV commercials is at the upper end of the sampling range whereas recorded meetings are processed at two frames per second. In the method according to the present invention, to select N candidates, the N/2 largest distances between subsequent frames are determined and used as candidate boundaries at step 703. Because N/2 is selected much larger than the number of shot boundaries expected in the source material, the method according to the present invention considers many more candidates than the usual approaches that use up to three frames per shot. Both the frame before and after a candidate boundary are included in the set of candidate frames to deal with cases in which a video sequence changes very gradually but constantly so that there are significant differences between the first and the last frame of that sequence.

The boundaries between dissimilar frames are potential shot boundaries so that the method according to the present invention is seen as performing an implicit shot segmentation. The average shot duration is five seconds in a mixture of material, so that the user can expect about 720 shot boundaries per hour. For material involving captured meetings, that number is significantly lower. The use of 1300 candidates for up to a one-hour long video has been utilized with good success. Once all the candidate frames have been determined, they are clustered according to the present invention at step 402 in FIG. 4.

Clustering Frames

An object of the present invention with regard to selecting keyframes is to determine a set of keyframes that are different from each other and that provide a good representation of all the frames in the video. Clustering combines similar frames so that selecting one frame from each cluster meets a goal of the present invention. Furthermore, if more or fewer keyframes are desired, the user or application simply increases or decreases the number of clusters according to the present invention.

For comparing frames, a wide variety of common image comparison methods are alternatively employed according to the present invention. An ideal comparison of images will produce results similar to human perception, i.e., images that are perceived as different will receive high scores from the comparison function while similar images will receive low scores. Different approaches to image comparison have different advantages. Pixel-wise comparison is sensitive to motion but otherwise very good to classify image differences. Comparing just the luminance of the pixels is usually sufficient. For an invariance to slight overall brightness changes, the luminance should be normalized by determining the mean and the standard deviation of the luminance values of all pixels. For each pixel, the mean is subtracted from the luminance value and divided by the standard deviation. Histogram-based approaches are very good to detect overall differences in images. Dividing an image into several areas (e.g., a 3×3 grid) and computing histograms for each of the areas reduces the effect of large object motion. Experiments showed that the use of too many bins in the histogram produces too many false positives, i.e., images considered to be different whereas they look similar to human judges. To make the comparison even less susceptible to noise, smooth histograms were used. In such histograms, each bin spills a fraction of its contents into the neighboring bins. To allow for color effects, a three-dimensional histogram was used in the YUV color space with 8 bins for Y (luminance) and 4 bins each for U and V (chroma) for a total of 128 bins. Just like for the pixel-wise comparison, it is beneficial to normalize the luminance before populating the histogram. Different methods of histogram comparison (intersection, sum of absolute difference, CHI square) produced almost identical results. The CHI square method performed much better than the others for images of a uniform color (e.g., generated by a VCR as the background). In the preferred embodiment of the present invention, a histogram technique is used to compare images, although there is no limitation according to the present invention to histogram-based comparisons techniques. Histogram-based approaches are very good for detecting overall differences in images. To make the comparison even less susceptible to noise, smooth histograms were used. $A_\chi^2$ (Chi-square) metric is preferably used to compare histograms, although there is no limitation according to the present invention that a Chi-square metric be used for comparison of histograms.

Figure 8:
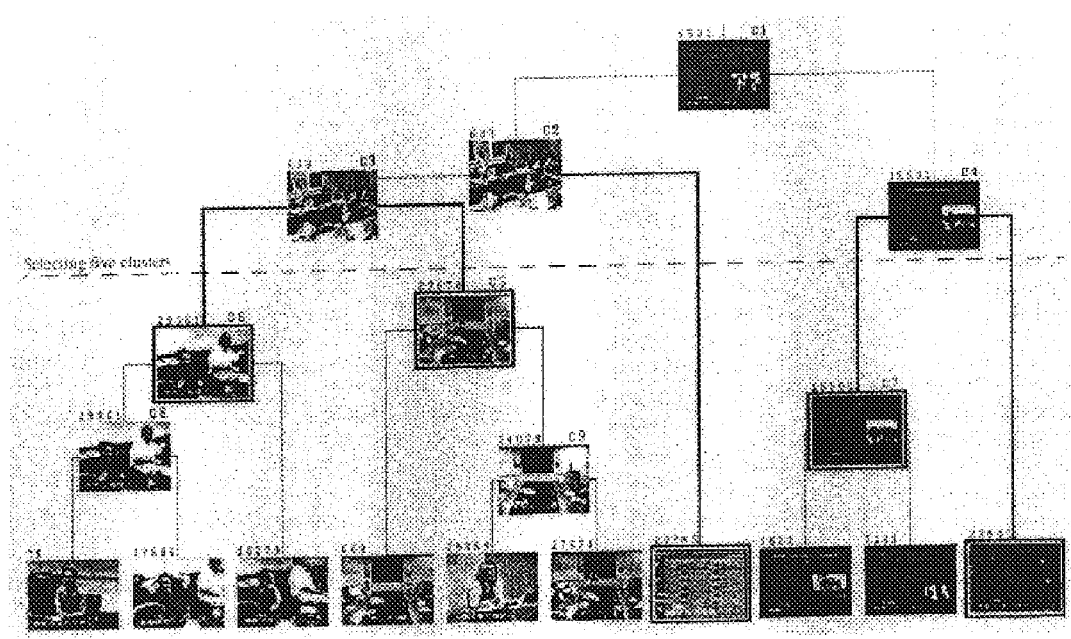
FIG. 8 is a binary tree illustrating the results of the hierarchical clustering of the candidate frames and the selection of clusters from keyframe extraction according to the present invention.

For extracting M keyframes, the material is divided into M clusters according to the present invention. This approach sidesteps the problem of selecting an appropriate threshold for the cluster size. Frames are preferably clustered at step 402 using the complete link method of the hierarchical agglomerative clustering technique. Small, tightly bound clusters are characteristic of that method. Unfortunately, the time complexity is higher than that of other hierarchical clustering methods such as single link. Other clustering methods are used as well with slightly different results according to the present invention. FIG. 8 shows that the hierarchical clustering is performed by combining the two clusters that produce the smallest combined cluster.

Figure 9:
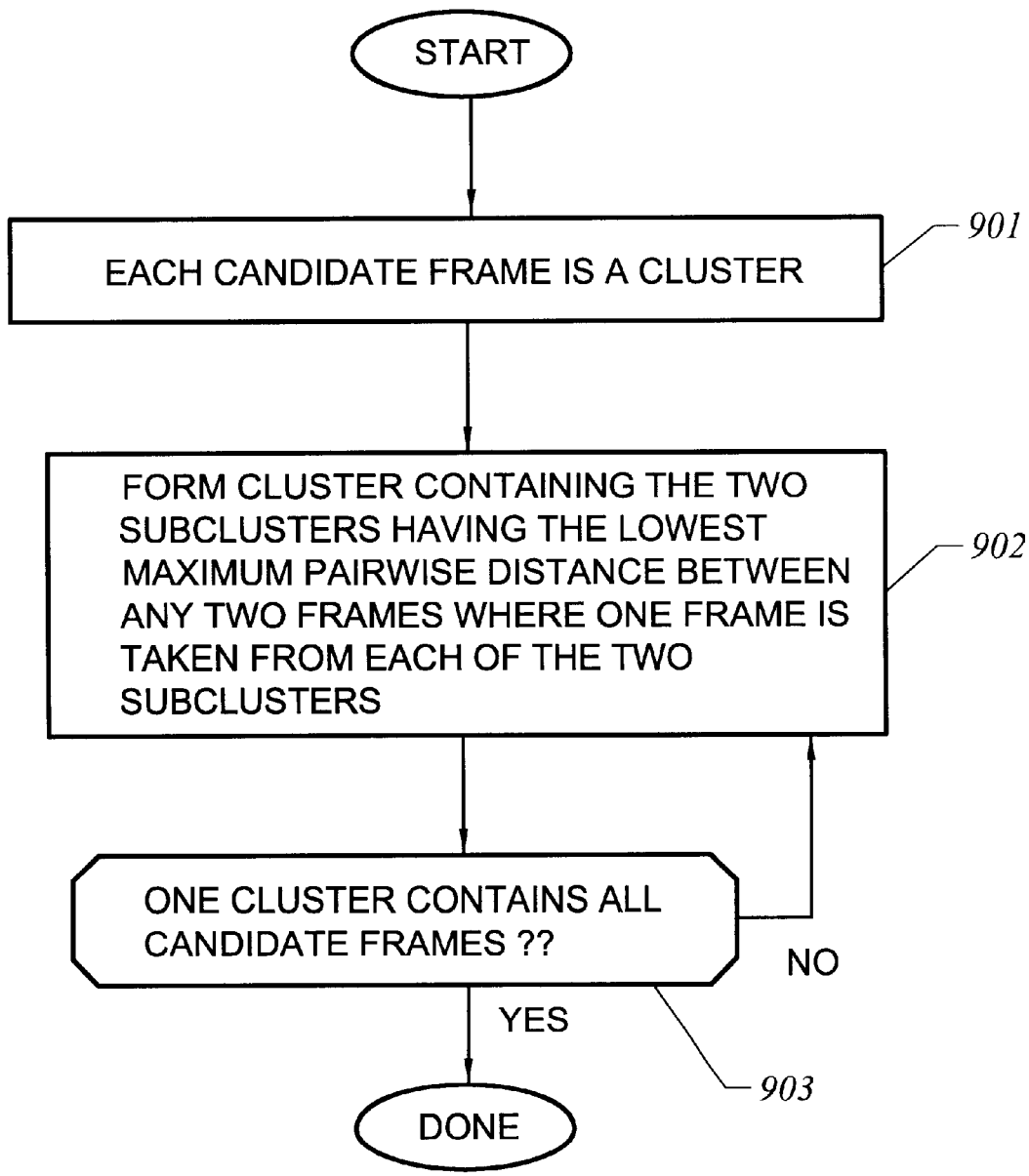
FIG. 9 is a flow chart illustrating the steps performed in the clustering of the candidate frames according to the present invention.

FIG. 9 illustrates the preferred hierarchical clustering method according to the present invention. Initially, each image represents its own cluster, as shown in step 901. This method uses the maximum of the pair-wise distances between the frames in two clusters to determine the inter-cluster similarity. At step 902, a cluster is formed containing the two sub-clusters having the lowest maximum pair wise distance between any two frames where one frame is taken from each of the two sub clusters. At step 903, it is determined whether or not all candidate frames have been agglomerated into a single root cluster such as C1 shown in FIG. 8. The altitude or a node in the tree represents the diameter (maximum pair-wise distance of the members of the two subclusters) of the combined cluster. Clusters are represented by the member frame closest to the centroid of the cluster. Note that the frames in the tree are not in temporal order. Their position in time is indicated via the frame number at the top-left of every image (30 frames per second). In the example shown, the clusters C1 through C4 are split to extract five keyframes, the direct children of the split clusters (see the emboldened parts of FIG. 8).

In very uniform source material, clusters are small because images distances are small as well. In material with many different scenes, not all good keyframes will be extracted but it seems to be more important to extract as many keyframes as the application requests. Typically, applications will base the requested number of keyframes on the total length of the video. The application shown in FIG. 2 uses 20 keyframes per hour.

Filtering Out Clusters

Figure 10:
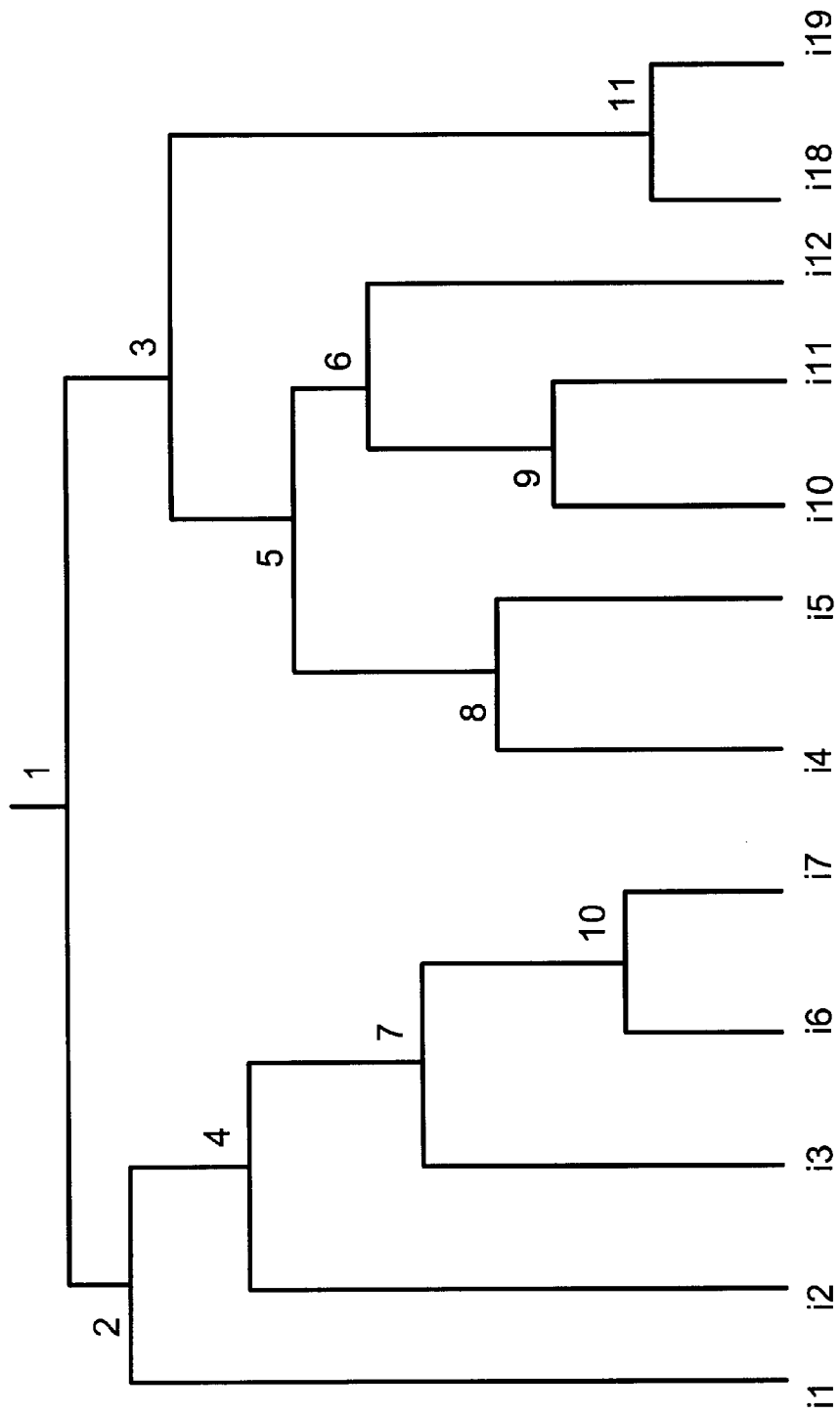
FIG. 10 is another binary tree illustrating the results of the hierarchical clustering of the candidate frames according to the present invention.
Figure 11:
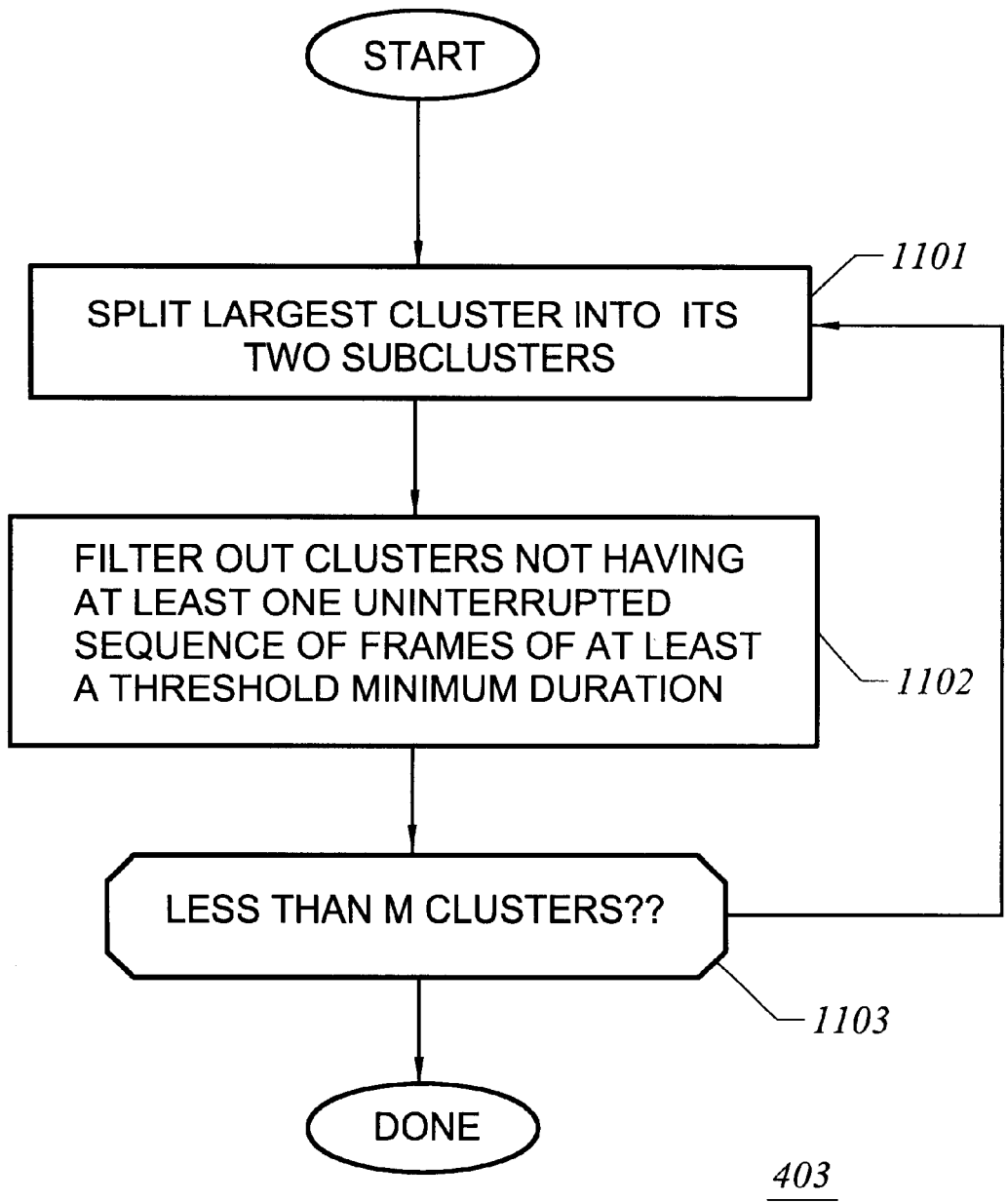
FIG. 11 is a flow chart illustrating the selection of clusters from which keyframes are extracted according to the present invention.

To determine the top M clusters, the largest M-1 clusters are split at step 403 in FIG. 4. In the example shown in FIG. 10, clusters 1, 2 and 3 are split resulting in four clusters: i1, 4, 5, and 11. FIG. 11 illustrates the method of selecting clusters from which keyframes will be extracted according to the present invention which is shown as step 403 in FIG. 4. At step 1101 the largest cluster is split into its two sub clusters. At step 1102, clusters not having at least one uninterrupted sequence of frames of at least a threshold minimum duration are filtered out. At step 1103, it is determined whether or not all M clusters have been selected yet.

Clusters containing only a single image are very likely to represent video artifacts such as switching distortion or other types of noise. Frames with such artifacts are undesirable as keyframes, so temporal constraints are used to filter out the corresponding clusters according to the present invention at step 1102. In general, a cluster should represent at least one uninterrupted sequence of frames of a minimum duration to make sure that video artifacts and other non-significant events are not used as keyframes. The duration threshold depends on the source material. The number of keyframes per hour also influences the minimum duration because the constraint has to be relaxed when more keyframes are requested. In tests with different source materials, it was determined that using three percent of the average time between keyframes as a threshold produced good results. For example, if there is on average one keyframe every five minutes (300 seconds), each cluster must have at least one uninterrupted nine-second sequence of frames. For video recordings of meetings, a threshold of ten seconds has led to good results. For movies and TV shows, a shorter threshold of three seconds is more appropriate. TV commercials require an even shorter threshold of one second. Clusters that do not contain at least one uninterrupted sequence of frames exceeding the threshold duration are filtered out at step 1102. In the example shown in FIG. 10, the cluster containing only i1 is filtered out. Because the same number M of selected clusters is returned, more clusters need to be picked at first. In the example of FIG. 10, cluster 4 is split as well, adding clusters i2 and 7. The cluster containing only i2 is filtered out as well so that cluster 5 has to be split, adding clusters 6 and 8. This leads to the final set of clusters 6, 7, 8, and 11.

Different durations are appropriate for different source materials. A minimum length of two seconds was sufficient to filter out clusters with frames displaying video synchronization artifacts caused by camera switches. This filtering approach is sensitive to the number of candidates. Using only 200 candidates instead of 1,000 for a one hour video reduced the quality of the selected keyframes noticeably because some clusters did not contain enough frames to satisfy the filter condition. The quality only varied very little between 500 and 1,000 candidates.

Figure 12A:
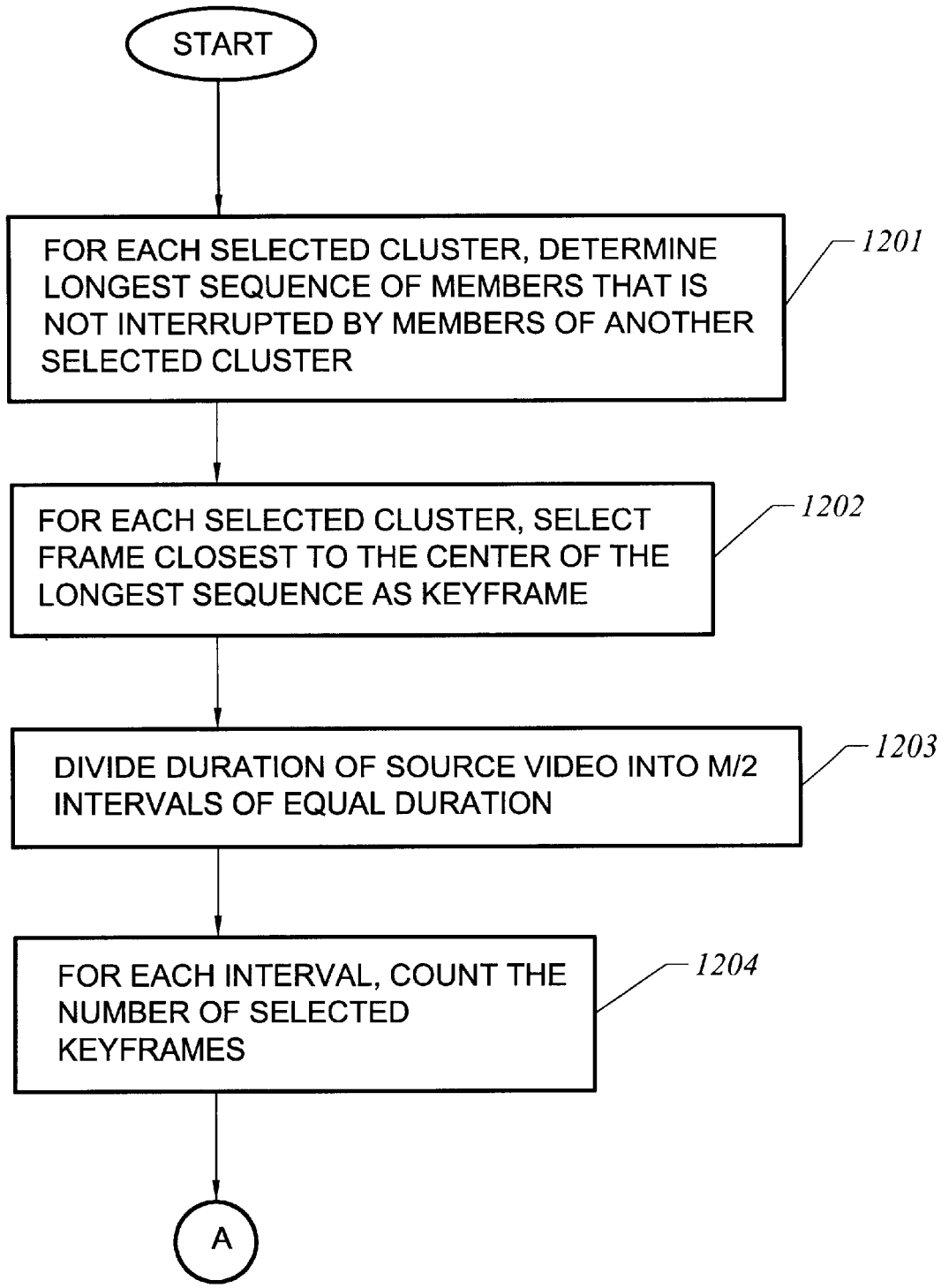
FIG. 12A is a flow chart illustrating a method for applying a temporal constraint for selecting as a keyframe for each selected cluster the frame closest to the center of the longest sequence of cluster members that is not interrupted by members of another selected cluster according to the present invention.
Figure 12B:
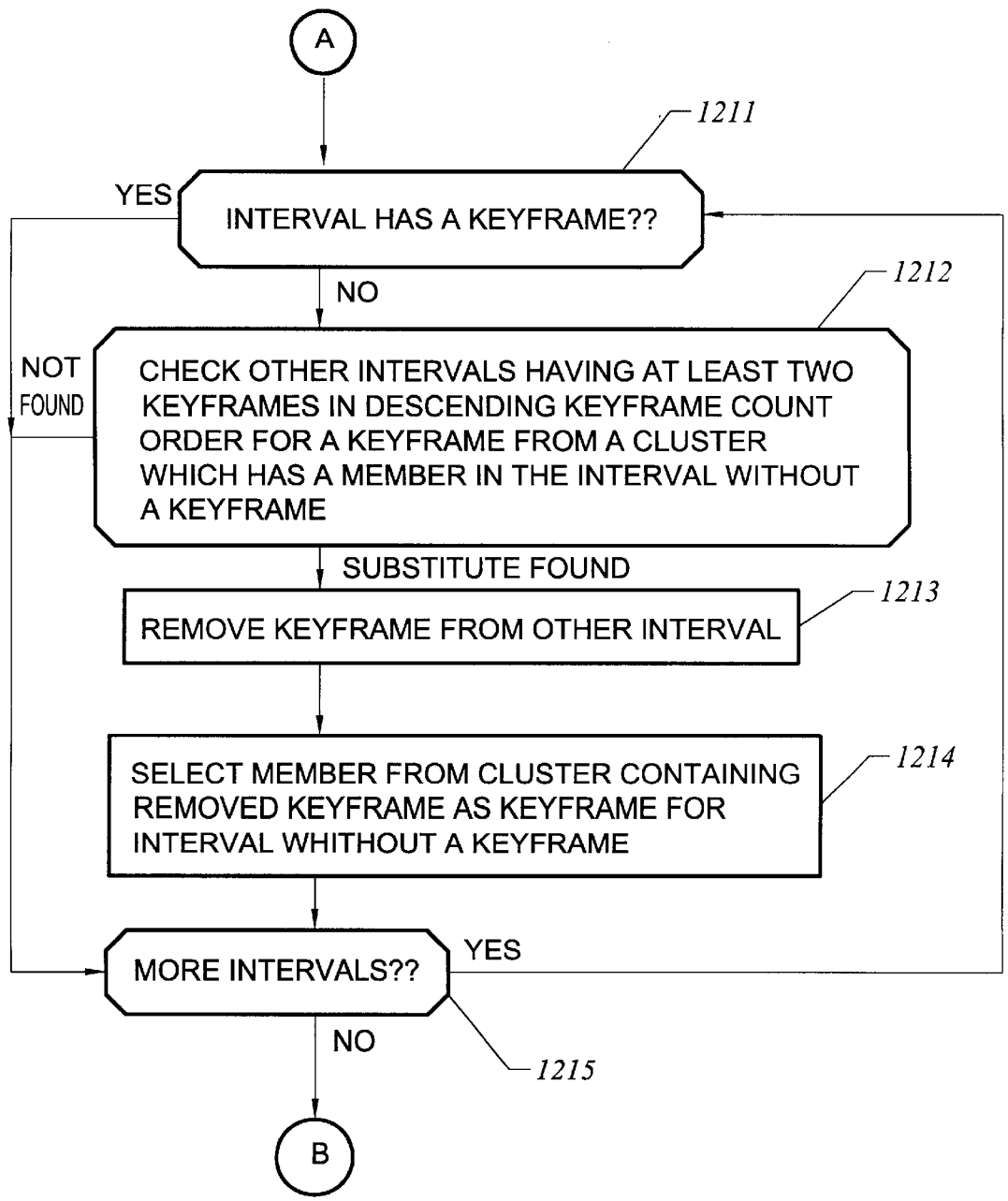
FIG. 12B is a flow chart illustrating a method for applying a temporal constraint for attempting to provide sufficient keyframes inclusion over all portions of the source video so as not to allow large gaps to occur without any keyframes according to the present ivention.
Figure 12C:
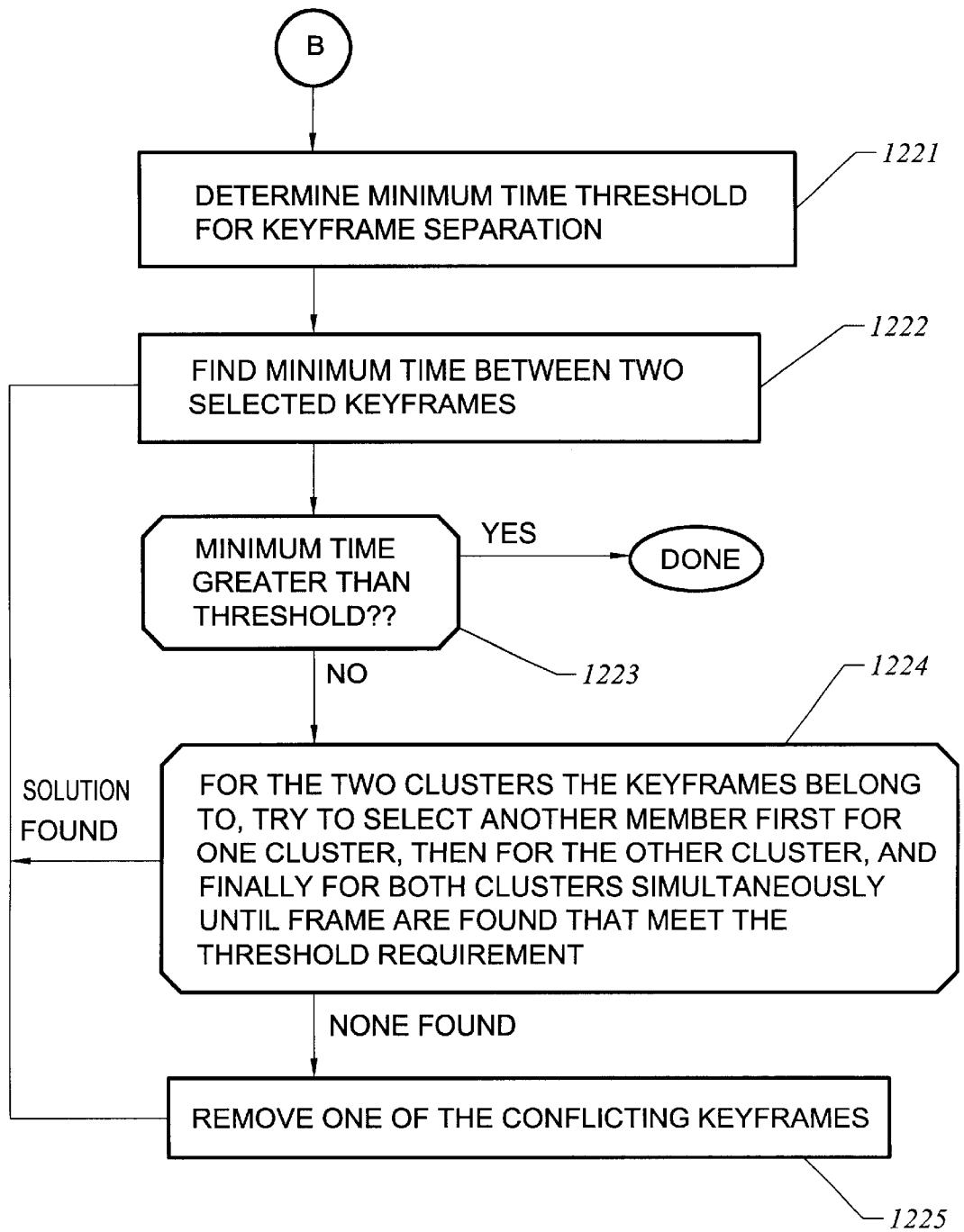
FIG. 12C is a flow chart illustrating a method for applying a temporal constraint for guaranteeing at least minimum time separation between keyframes according to the present invention.

Applying Temporal Constraints for Selecting Representative Frames from the Clusters From each cluster the member is selected as the keyframe that meets the temporal constraints best at step 404 in FIG. 4. Such constraints require a somewhat even distribution of keyframes over the length of the video and a minimum distance between keyframes for some applications. FIGS. 12A, 12B, and 12C illustrate the application of temporal constraints and the selection of the keyframes from the clusters according to the present invention.

Some methods produce keyframes that are very unevenly distributed over time and sometimes very close together in time. Because keyframes are intended to be attached to a time line in the application, it is desirable to spread them out over time. The application presents keyframes to support skimming through a video, thus a semi-uniform distribution of keyframes is desirable. It is undesirable if the keyframes are too close together in time. These constraints are addressed by a proper selection of representative frames from the clusters according to the present invention. Members of the same cluster are preferably reasonably similar to each other so that any member can serve as the representative of a cluster. These constraints leave room for applying temporal constraints to the selection of a keyframe from each cluster.

Usually, clusters contain member frames spread out all over the time duration of the video. It is desirable to pick a representative frame from a time that the cluster dominates to give a good summary of a video. To that end, at step 1201, the longest sequence of members is determined for each selected cluster that is not interrupted by members of another selected cluster. The frame closest to the center of that sequence is chosen at step 1202. This frame selection according to the present invention has the added benefit that it maximizes the distance in time between the representative frame and any frame from another cluster so that it becomes more likely that keyframes are not too close together.

In FIG. 10, the images are numbered in their temporal order. Cluster 7 is the only non-contiguous cluster with images i3, i6, i7. i6 and i7 represent the longest sequence and both images have the same distance from the center of the sequence. Cluster 6 contains i10, i11 and i12 so that i11 is chosen as the representative frame.

The total duration of the source clip is divided into intervals of equal duration at step 1203. There need to be fewer intervals than requested keyframes. Using half as many intervals as requested keyframes produced good results. For each interval, the number of selected keyframes in that interval is counted at step 1204.

Applying the selection strategy described above does not guarantee that there are no large gaps between keyframes. To ensure a semi-uniform distribution of keyframes, the total duration of the source clip is divided into intervals of equal duration that each should contain at least one keyframe at step 1203. Using half as many intervals as requested keyframes produces good results and is therefore the preferred number of intervals, although this is not a limitation of the present invention.

In FIG. 12B, test 1211 determines if an interval has a keyframe within it. For intervals that do not contain a keyframe, keyframes are determined as follows. At step 1212, all intervals containing at least two keyframes are checked in descending keyframe count order. At step 1212, for each of the keyframes in an interval, it is checked whether the corresponding cluster also has a member in the interval without a keyframe. If such a member is found, it is used as a keyframe at step 1214, and the previously selected one is removed at step 1213. If there are more intervals to be examined, test 1215 repeats the above steps for the remaining intervals. For example, the frames i5, i7, i9 and i11 are chosen as initial keyframes. If the source clip is divided into three intervals and all images have the same temporal distance from each other, the first interval does not contain any keyframes and the third interval contains three. Cluster 7 is the only cluster represented in the third interval that has also frames in the first interval. Therefore, i7 is replaced by i3.

Some applications require a minimum distance between keyframes. For example, to attach all keyframes to a time line at the appropriate locations or to improve skimming through keyframes. FIG. 12C illustrates the method according to the present invention of guaranteeing a minimum acceptable separation between keyframes. After the minimum time threshold between keyframes has been determined at step 1221, the following method is applied according to the present invention. First, the minimum time between any two selected keyframes is determined at step 1222. If that time is longer than the required threshold time, test 1223 indicates that the method is done. If the minimum time between any two selected keyframes is less than the minimum time threshold, then for the two clusters the keyframes belong to, the method tries to select another member first for one cluster, then for the other cluster, and finally for both clusters at the same time until frames are found that meet the minimum distance requirement at step 1224. If no such cluster members is found, step 1225 decrement the number of selected keyframes and removes one of the two conflicting frames. The above steps 1222 through 1225 are repeated until all frames meet the constraint.

Figure 13:
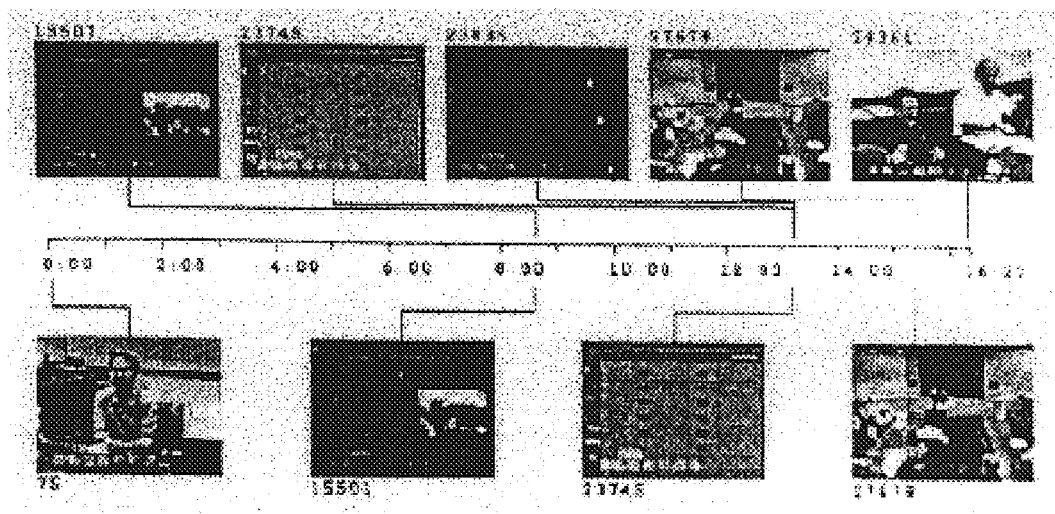
FIG. 13 illustrates key frames and their positions before and after executing the method shown in FIG. 12C for guaranteeing at least minimum time separate between keyframes according to the present invention.

As an example, this method is applied to the five selected keyframes shown at the top of FIG. 13 with a minimum distance requirement of two minutes (3600 frames). Frames 23745 and 23835 are only 90 frames apart. Both come from clusters containing only a single frame so that no alternatives are available. Frame 23835 is dropped and the method continues with four keyframes. The distance between frames 27678 and 29361 is 1685 frames. Frame 75 as a 15 replacement for frame 29361 maximizes the distance to all the other keyframes. Now the minimum distance between any two keyframes is 3933 frames, and the method stops. The bottom of FIG. 13 shows the resulting keyframes.

Emphasizing Video Features

Some classes of images are preferable as keyframes. For example, close-ups on people tend to provide more information than long shots. In addition, images of slides often are more different from each other than video images. If that tendency remains unchecked, sets of keyframes are heavily populated by slide images. Therefore, it is desirable to increase the proportion of images such as close-ups on people and to decrease the proportion of slide images in the set of selected keyframes.

Figure 14:
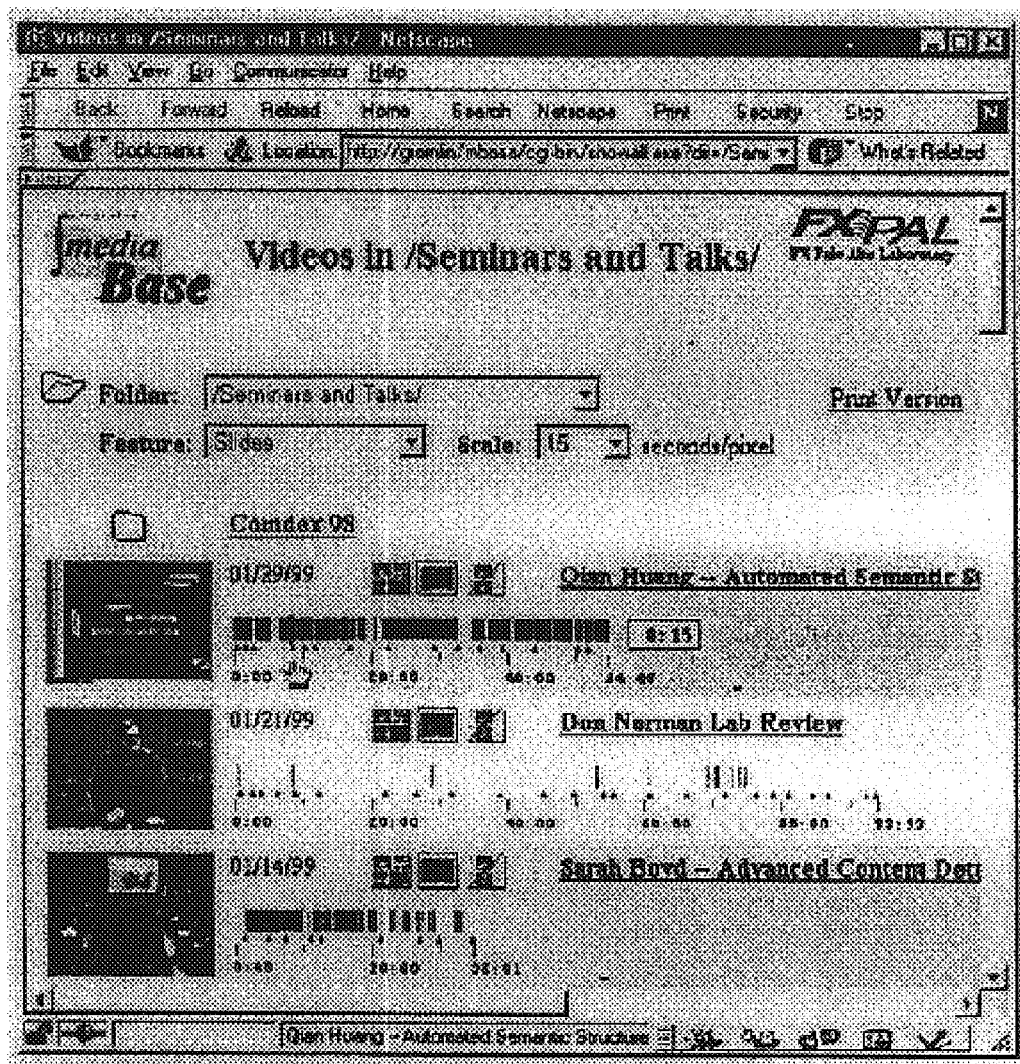
FIG. 14 illustrates a web-based video directory browser that presents directory listings of videos.

To emphasize or de-emphasize certain classes of keyframes, the comparison score is modified according to class membership according to the present invention. Confidence scores represent detected features and the computation of such scores with statistical models. One example is the detection of Microsoft PowerPoint slides. FIG. 14 presents the likelihood for the presence of a slide as a grayscale plot along the time line. Such slides are often fairly different from each other so that they would dominate the set of selected keyframes. To avoid this effect and to de-emphasize that class of images, the distance measure of two images is reduced by a factor $\alpha$ times the product of the feature confidences if the feature confidence for both of them is above a threshold $\beta$ (e.g., 0.5). If a feature needs to be emphasized, the same approach is alternatively taken by de-emphasizing everything not belonging to the feature class, i.e., by using the negated confidence.

$$\text{dist}' = \text{dist}(x,y)*(1-\alpha*\text{conf}(x)*\text{conf}(y));\ 0 \leq \alpha \leq 1;\ \text{conf}(x) > \beta;\ \text{conf}(y) > \beta$$

$$\text{dist}'' = \text{dist}(x,y)*(1-\alpha*(1-\text{conf}(x))*(1-\text{conf}(y)));\ 0 \leq \alpha \leq 1;\ \text{conf}(x) < \beta;\ \text{conf}(y) < \beta$$

Manipulating the distance function according to the present invention is sufficient for manipulating the clustering behavior so that the less desirable images are more likely to be clustered together. For a collection of captured meetings, this approach according to the present invention has reduced the number of slide images included in the keyframes to one or two per slide presentation.

Application for Keyframes

To facilitate access to a large collection of digitized videos of meetings and other events, a web-based video directory browser presents directory listings of videos (see FIG. 14). Videos are organized by content in directories (e.g., staff meetings, seminar presentations, conference reports) and sorted by date within each directory. Clicking on a video opens a viewer to play it. The use of a standard web browser and the MPEG file format enables casual access to the video archive for almost all potential users without the need for additional software or plug-ins. To ease the access to the videos, keyframes are provided according to the above-described method for selecting keyframes.

Figure 15:
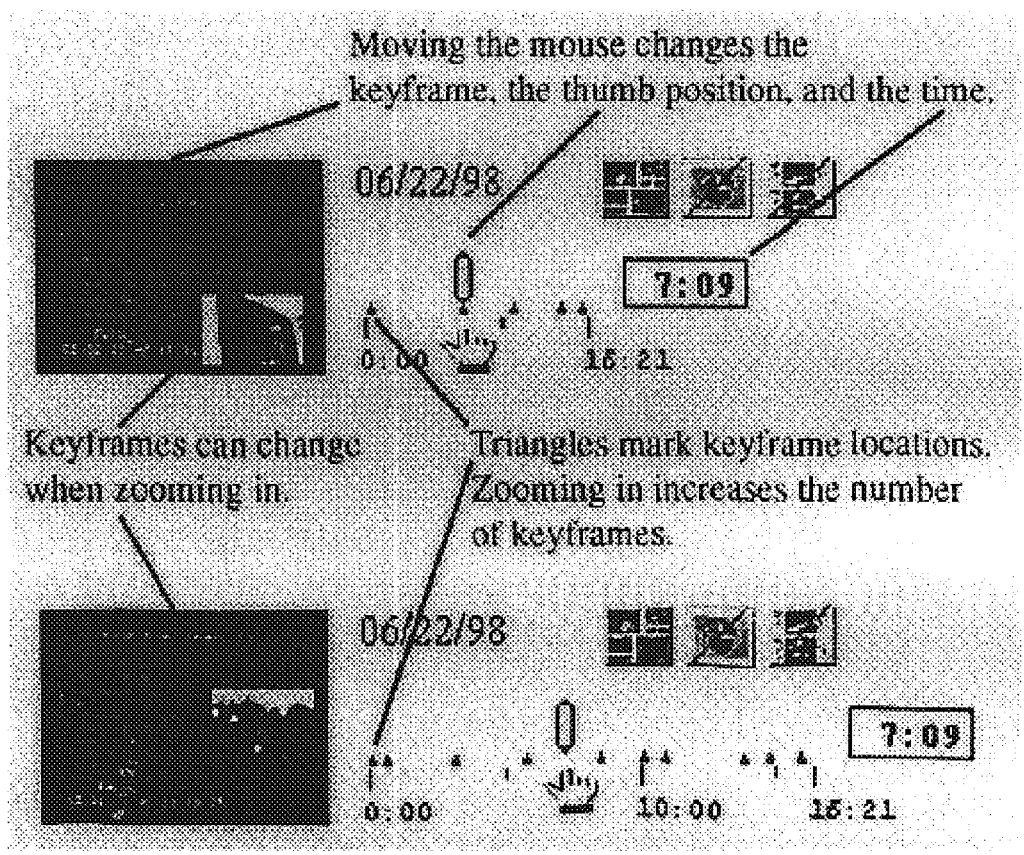
FIG. 15 illustrates the usage of the web-based video directory browser shown in FIG. 14.

Each video directory listing is enhances with representative frames to help recognize the desired video, and to provide access points into the video. Well-chosen keyframes help video selection and make the listing more visually appealing. Because it is difficult to distinguish videos based on a single keyframe, a number of keyframes are provided according to the present invention. Initially, a keyframe chosen by the video database administrator is displayed in the keyframe window (see FIG. 15). The positions of the keyframes are marked by blue triangles along a mouse-sensitive time scale adjacent to the keyframe. As the mouse moves over the timeline (shown as a hand cursor in FIG. 15), a slider thumb shows the position on the timeline, the keyframe closest to the mouse position is displayed, and the triangle for that keyframe turns red. This method shows only a single keyframe at a time, preserving screen space while making other frames accessible through simple mouse motion. This interface supports very quick skimming that provides a good impression of the content of the video. Clicking anywhere on the time scale opens the video and starts playback at the corresponding time. Using multiple keyframes in this way gives users an idea of the context and temporal structure of a video.

The number of keyframes is modified by zooming in or out. Zooming modifies the width of the time scale on the screen. The average spacing between keyframes on the screen remains the same so that increasing the width of the time scale also increases the number of attached keyframes (see FIG. 15).

Although the present invention has been described with respect to its preferred embodiment, that embodiment is offered by way of example, not by way of limitation. It is to be understood that various additions and modifications can be made without departing from the spirit and scope of the present invention. Accordingly, all such additions and modifications are deemed to lie with the spirit and scope of the present invention as set out in the appended claims.

What is claimed is:

1. A method for selecting keyframes from selected clusters, the method comprising the steps of:

(a) for each selected cluster, determining a longest sequence of members that is not interrupted by members of another selected cluster; and (b) for each selected cluster, selecting a frame closest to a center of the longest sequence of members as a keyframe for the selected cluster;

(c) dividing a source video duration into equal duration intervals;

(d) for each equal duration interval, counting a number of selected keyframes;

(e) checking an equal duration interval for a selected keyframe;

(f) if step (e) determined that the equal duration interval does not have any selected keyframes, checking other equal duration intervals having at least two keyframes in descending keyframe count order for a keyframe from a selected cluster which has a member in the equal duration interval that does not have any selected keyframes;

(g) if step (f) found the member in the equal duration interval that does not have any selected keyframes, removing the keyframe from the selected cluster which has the member in the equal duration interval that does not have any selected keyframes; and (h) if step (f) found the member in the equal duration interval that does not have any selected keyframes, selecting the member in the equal duration interval that does not have any selected keyframes as a keyframe for the equal duration interval that does not have any selected keyframes; and (i) returning to step (e) if step (e) has not been performed on all equal duration intervals.

2. A method as in claim 1, further comprising the steps of:

(j) finding a minimum time between two keyframes;

(k) comparing the minimum time between two keyframes to a minimum time threshold for keyframe separation; and (l) if step (k) determines that the minimum time between two keyframes is less than a minimum time threshold for keyframe separation, for a corresponding two clusters that the keyframes belong to, attempting to select another member first for one cluster, then for the other cluster, and finally for both clusters simultaneously until frames are found that are separated at least by the minimum time threshold.

3. A method as in claim 2, further comprising the step of:

(m) if step (l) and does not find frames that are separated at least by the minimum time threshold, removing one of the two keyframes; and (n) if step (l) is performed, returning to step (j).

* * * * *